United States Patent Office.

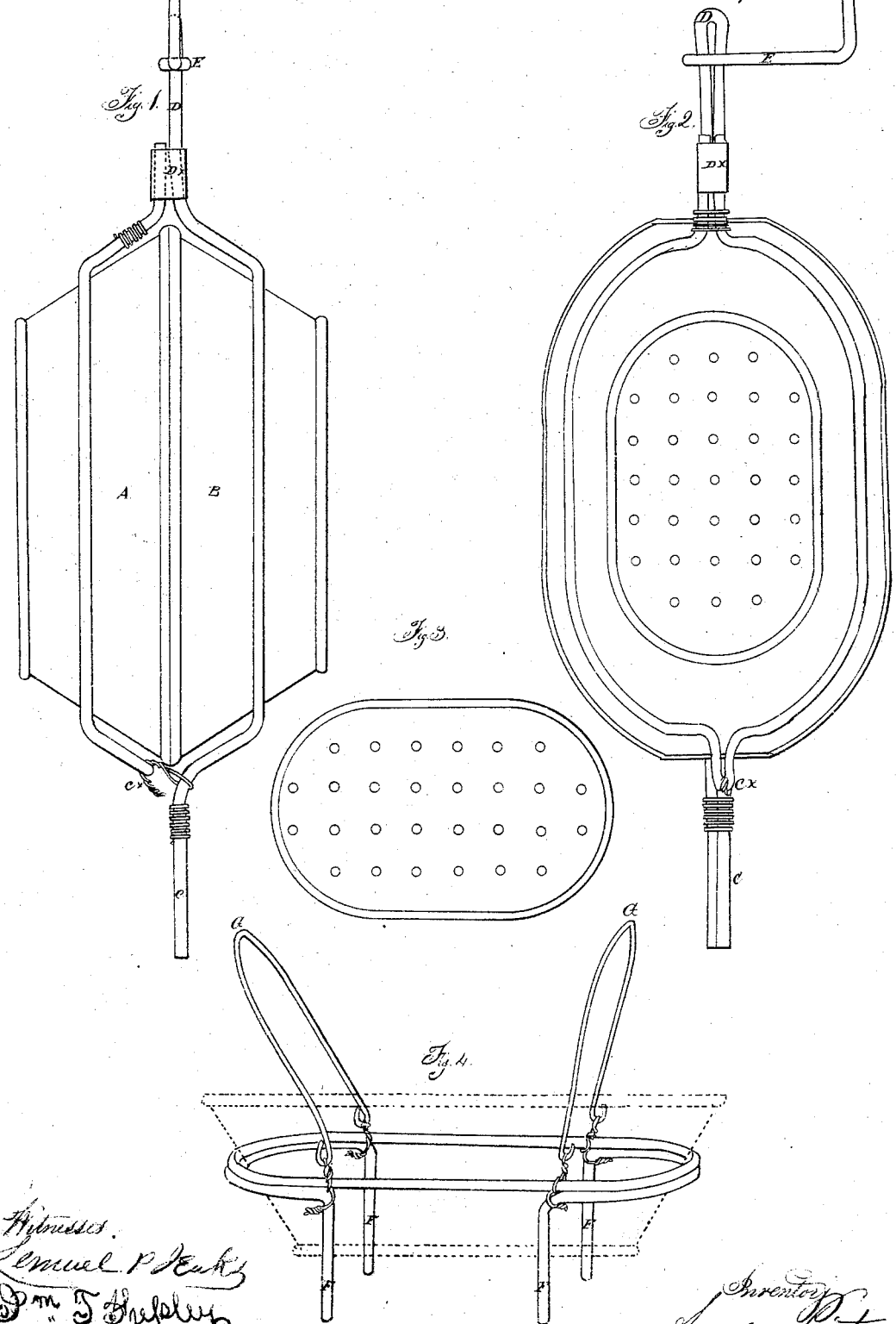

AMOS PORTER, OF CHARLESTOWN, MASSACHUSETTS, ASSIGNOR TO HIMSELF AND N. S. PAYNE, OF SAME PLACE.

Letters Patent No. 74,770, dated February 25, 1868.

COAL-HOD AND SCREEN.

*The Schedule referred to in these Letters Patent and making part of the same.*

TO ALL WHOM IT MAY CONCERN:

Be it known that I, AMOS PORTER, of Charlestown, Middlesex county, State of Massachusetts, have invented a new and improved Combined Coal-Hod and Sifter; and I do hereby declare that the following is a full and exact description of the same, reference being had to the drawings herewith annexed, with letters of reference marked thereon. In the drawings—

Figure 1 is a side view of my hod-sifter arranged to be used as a sifter.

Figure 2 is a top view of the same.

Figure 3 is a view of the perforated bottom of that half not shown in fig. 2.

Figure 4 is a view from the side, in perspective, of a stationary holder to hold the two pans, (latter marked in dotted lines,) the same being arranged to be used as a hod; and, In the drawings, A B, fig. 1, are two pans or troughs, with perforated oblong bottoms (seen in figs. 2 and 3) and flaring sides, which fit together at their open tops, as seen in fig. 1, where the device is shown as a sifter. The pans are held together by the sifting-frame C D, figs. 1 and 2, which consists of a stout piece of wire bent at the point D, and proceeding in double length horizontally toward the pans, where the lengths proceed downward diagonally, (see fig. 1,) and then, separating, proceed around the sides of the pan (see fig. 2) to the other end of the same, where both lengths becoming parallel, proceed upward diagonally, and then horizontally, to the distance seen in figs. 1 and 2. At the horizontal portions of each end the two lengths are fastened together. The other pan has a similar arrangement of wires, hinged to the first described, at the point $C^\times$, figs. 1 and 2, and fastened to it at the point $D^\times$, figs. 1 and 2, by the short cylinder $D^\times$. E, figs. 1 and 2, is the crank by which the device is rotated, and by this rotation the sifting of coal-dust is performed. I sometimes use a casting of malleable iron, or other metal, instead of wire, for the sifting-frame.

The mode in which I perforate the bottoms of the troughs or pans is peculiar, as will be seen by the figs. 2 and 3, the holes being so arranged as that no one hole in one pan comes opposite to a hole in the other pan. This is the sifting-arrangement. As any support may be used indifferently to hold the sifting-frame during sifting, no special one is described.

I sometimes use the two pans, when placed together, as an ash-pan, and sometimes as a coal-hod. When the device is to be used as a coal-hod, the cylinder $D^\times$ is slipped back, the upper wire of fig. 1 is thrown back, by means of the hinge $C^\times$, and, the pans A and B being removed, are separated, and one is placed within the other. They then present the appearance shown by the dotted lines in fig. 4, which fig. 4 is a view of the hod-frame, or stationary frame, consisting of an oblong frame of wire (or other material) having four legs, F F F F, and two handles, G G.

Owing to the peculiar arrangement of the holes referred to above, the dust, &c., does not sift through the bottom formed of the combined bottoms of the two troughs or pans, being sufficiently tight for all practical purposes.

The operation of my device I have described in describing its construction; and

What I claim herein as of my own invention, and desire to secure by Letters Patent, is—

1. I claim the combined hod or ash-pan and sifter, when it is made of two parts so constructed as that one half fits into or upon the other half, and the bored holes of the sifting-bottoms are so arranged as not to come opposite to each other when one pan is put into the other, thus fitting the parts to act as a hod or ash-pan, all substantially as described.

2. I claim the rotating holder or sifting-frame to hold the two parts of the hod-sifter together, in combination with the hod-sifter, when all are constructed and used substantially as described.

3. I claim the stationary holder or hod-frame, when constructed with bails or handles, in combination with the two containing-vessels or pans, when bored in the bottoms, all substantially as described.

4. I claim the general construction and arrangement of the whole device, when made and used substantially as described.

AMOS PORTER.

Witnesses:
LEMUEL P. JENKS,
WM. T. SHEPLEY.